United States Patent
Itou et al.

(10) Patent No.: US 8,978,268 B2
(45) Date of Patent: Mar. 17, 2015

(54) FREEZE-DRYING APPARATUS AND FREEZE-DRYING METHOD

(75) Inventors: Masaki Itou, Kanagawa (JP); Kyuzo Nakamura, Kanagawa (JP); Takeo Kato, Kanagawa (JP); Katsuhiko Itou, Kanagawa (JP); Takashi Hanamoto, Kanagawa (JP)

(73) Assignee: Ulvac, Inc., Kanagawa (JP)

( * ) Notice: Subject to any disclaimer, the term of this patent is extended or adjusted under 35 U.S.C. 154(b) by 1011 days.

(21) Appl. No.: 13/003,002

(22) PCT Filed: Jul. 8, 2009

(86) PCT No.: PCT/JP2009/062426
§ 371 (c)(1),
(2), (4) Date: Jan. 7, 2011

(87) PCT Pub. No.: WO2010/005021
PCT Pub. Date: Jan. 14, 2010

(65) Prior Publication Data
US 2011/0192047 A1    Aug. 11, 2011

(30) Foreign Application Priority Data
Jul. 10, 2008   (JP) .................................. 2008-180124

(51) Int. Cl.
F26B 5/06      (2006.01)
F26B 9/00      (2006.01)
A23L 3/44      (2006.01)

(52) U.S. Cl.
CPC .. *A23L 3/44* (2013.01); *F26B 5/065* (2013.01)
USPC .................................. 34/291; 34/295; 34/164

(58) Field of Classification Search
USPC ............. 34/284–293, 295, 296, 164, 92, 165; 110/165 R; 414/791.5, 198, 192, 207, 414/214; 193/2 B; 222/196, 198–201, 161, 222/162, 164–166, 613, 619, 620; 366/31, 366/114, 108, 154
See application file for complete search history.

(56) References Cited

U.S. PATENT DOCUMENTS

| 3,362,835 A | 1/1968 | Thuse et al. |
| 3,445,247 A * | 5/1969 | Baerwald ...................... 426/640 |
| 4,670,993 A * | 6/1987 | Dunaway et al. ............... 34/371 |
| 8,012,313 B2 * | 9/2011 | Carson et al. ................... 203/48 |
| 2008/0104891 A1 * | 5/2008 | Day .............................. 49/366 |

FOREIGN PATENT DOCUMENTS

| EP | 2320185 A1 | 5/2011 |
| FR | 1211320 A | 3/1960 |

(Continued)

OTHER PUBLICATIONS

European Supplemental Search Report and Search Opinion for PCT/JP2009062426 filed Jul. 8, 2009.

*Primary Examiner* — Kenneth Rinehart
*Assistant Examiner* — John McCormack
(74) *Attorney, Agent, or Firm* — Harness, Dickey & Pierce, PLC (57) ABSTRACT

[Object] To provide a freeze-drying apparatus and a freeze-drying method, which are capable of increasing a drying efficiency of frozen particles.
[Solving Means] The freeze-drying apparatus 100 includes a freezing chamber 10 into which a raw material fluid F is injected. During the injection of the raw material fluid F, after the injection of the raw material fluid F, or for a time period covering the start to the termination of the injection of the raw material fluid F, a shelf 16 is vibrated in a horizontal direction due to an actuation of vibration generators 31. With this, the frozen particles deposited on the shelf 16 are evenly diffused on the shelf 16 in such a manner that a deposition thickness thereof becomes smaller or a single layer thereof is formed. With this, a freezing efficiency and the drying efficiency of individual particles are promoted.

1 Claim, 12 Drawing Sheets

(56) References Cited

FOREIGN PATENT DOCUMENTS

| JP | 2003-207268 A | 7/2003 |
| JP | 2004-232883 | 8/2004 |
| JP | 2005-168904 A | 6/2005 |
| JP | 2005168904 A | 6/2005 |
| JP | 2006-177640 A | 7/2006 |

* cited by examiner

FREEZE-DRYING APPARATUS AND FREEZE-DRYING METHOD

TECHNICAL FIELD

The present invention relates to an injection-type freeze-drying apparatus and a freeze-drying method, which is capable of injecting a raw material for a medical product, a food product, a cosmetic product, or other chemicals in a vacuum chamber, to thereby freeze-dry the raw material.

BACKGROUND ART

In an injection-type freeze-drying apparatus, a raw material fluid is injected in a vacuum chamber, the raw material fluid being obtained by dissolving or dispersing a raw material for a medical product, a food product, a cosmetic product, or the like in a solvent or a disperse medium. In the above-mentioned injection process, the solvent takes heat from the raw material due to latent heat of vaporization thereof, and thus the raw material is frozen and dried. At this time, the raw material is formed into fine particles, and then is collected in a collector provided in a lower portion of the vacuum chamber. Further, in order to promote the above-mentioned drying action, the raw material is heated by a resistive-heating-type heater provided to the collector. It should be noted that in order to efficiently freeze the raw material within the vacuum chamber, the raw material is previously cooled before the raw material is injected in the vacuum chamber (for example, see Patent Document 1).

An apparatus (30) disclosed in Patent Document 2 transports frozen fine particles (F), which have been discharged from a vacuum freezing column (11), by use of a conveyor belt (22) provided in a drying chamber (21). It is proposed that in place of the conveyor belt (22), a vibrating conveyor may be used (for example, see Patent Document 2).

It should be noted that in the general freeze-drying method in the past, the raw material is frozen in advance before the raw material is received in the vacuum chamber, while in the injection-type freeze-drying method, the raw material is injected, formed into particles, and frozen by itself in the vacuum chamber. In view of the above-mentioned point, those methods are different from each other.

CITED DOCUMENT

Patent Document

Patent Document 1: Japanese Patent Application Laid-open No. 2004-232883 (paragraph [0042], FIG. 1)
Patent Document 2: Japanese Patent Application Laid-open No. 2006-177640 (paragraph [0039], FIG. 6)

DISCLOSURE OF THE INVENTION

Problem to be solved by the Invention

By the way, for example, in the drying chamber (21) of the apparatus (30) disclosed in the above-mentioned Patent Document 2, a resistive-heating-type heater (25) is provided, and thus the drying process for the frozen fine particles (F) is promoted. Here, it is conceivable that the frozen fine particles (F) are dried more efficiently, and hence a quality of the particle products can be enhanced.

In view of the above-mentioned circumstances, it is an object of the present invention to provide a freeze-drying apparatus and a freeze-drying method, which are capable of increasing a drying efficiency of frozen particles.

Means for solving the Problem

In order to achieve the above-mentioned object, a freeze-drying apparatus according to an embodiment of the present invention includes a vacuum chamber, an injection mechanism, a shelf, and a diffusion mechanism.

The vacuum chamber is capable of being exhausted. The injection mechanism injects a raw material fluid including a raw material into the vacuum chamber exhausted.

The shelf receives the raw material frozen when the raw material fluid is injected.

The diffusion mechanism at least diffuses the raw material on the shelf by a vibration, the raw material being received on the shelf.

A freeze-drying method according to an embodiment of the present invention includes injecting a raw material fluid including a raw material into a vacuum chamber exhausted.

The raw material is at least diffused on a shelf by a vibration, the raw material being frozen when the raw material fluid is injected and being received by the shelf.

BEST MODE(S) FOR CARRYING OUT THE INVENTION

A freeze-drying apparatus includes a vacuum chamber, an injection mechanism, a shelf, and a diffusion mechanism. The vacuum chamber is capable of being exhausted. The injection mechanism injects a raw material fluid including a raw material into the vacuum chamber exhausted. The shelf receives the raw material frozen when the raw material fluid is injected. The diffusion mechanism at least diffuses the raw material on the shelf by a vibration, the raw material being received on the shelf.

The raw material on the shelf is diffused by the vibration, and hence it is possible to efficiently dry the frozen particles on the shelf.

The diffusion mechanism may include a vibration generator to vibrate the shelf.

The vibration generator may vibrate the shelf in a horizontal direction or an upper and lower direction. It is sufficient for the horizontal direction to be a substantial horizontal direction in light of the spirit of the present invention. Similarly, it is sufficient for the upper and lower direction to be a substantial upper and lower direction in light of the spirit of the present invention.

The freeze-drying apparatus may further include a tilt mechanism to tilt the shelf in order to collect the raw material on the shelf. In a state in which the raw material on the shelf is diffused by the diffusion mechanism, the tilt mechanism is capable of tilting the shelf. Thus, it is possible to increase the collection rate of the raw material on the shelf.

The diffusion mechanism may include a first vibration generator to vibrate the shelf when the shelf is held in a horizontal state, and a second vibration generator to vibrate the shelf when the shelf is held in a tilted state.

The shelf may include at least a first shelf member and a second shelf member. In this case, the tilt mechanism may include a first tilt mechanism to tilt the first shelf member, and a second tilt mechanism to tilt the second shelf member. Thus, the first shelf member and the second shelf member may be tilted by the first tilt mechanism and the second tilt mechanism, to thereby split the shelf into the first shelf member and the second shelf member, respectively.

The diffusion mechanism may include a first vibration generator to vibrate the shelf when the first shelf member and the second shelf member are held in a horizontal state, and a second vibration generator to vibrate the shelf when the first shelf member and the second shelf member are held in a tilted state. In this case, one first vibration generator may be provided, or two first vibration generators may be provided so that the first shelf member and the second shelf member can be each vibrated. The same applies to the second vibration generator.

The vacuum chamber may include a freezing chamber within which the shelf is arranged, and the diffusion mechanism may include a vibration generator to vibrate the freezing chamber. In the case where the shelf is arranged within the freezing chamber as described above, the freezing chamber may be vibrated by the vibration generator, to thereby vibrate the shelf.

The vacuum chamber may include a freezing chamber into which the raw material fluid is injected, and a drying chamber within which the shelf is arranged, the drying chamber being connected to the freezing chamber in a hermetically sealed manner. In this case, the diffusion mechanism may transport the frozen raw material by the vibration. In this case, the diffusion mechanism may include a vibration generator to vibrate the shelf, or the diffusion mechanism may include a vibration generator to vibrate the drying chamber. Otherwise, the diffusion mechanism may vibrate the shelf.

The vibration generator may include a vibration motor mounted to the drying chamber in a changeable mounting angle in order to control a transport speed for the raw material.

Also in a case where the vibration generator vibrates the shelf itself, a vibration motor similar to the above-mentioned vibration motor may be used.

The freeze-drying apparatus may further include a thermal process mechanism to perform at least one of a heating and a cooling of the shelf. The shelf is cooled, and hence the freezing action of the raw material is promoted, or the shelf is heated, and hence the drying action of the particles after frozen is promoted. With this, a productivity of dried particles (particles after the frozen particles are dried by the thermal process mechanism) is promoted.

A freeze-drying method includes injecting a raw material fluid including a raw material into a vacuum chamber exhausted. The raw material is at least diffused on a shelf by a vibration, the raw material being frozen when the raw material fluid is injected and being received by the shelf. The raw material on the shelf is diffused by the vibration, and hence it is possible to efficiently dry the frozen particles on the shelf.

Hereinafter, embodiments of the present invention will be described with reference to the drawings.

Figure 1:
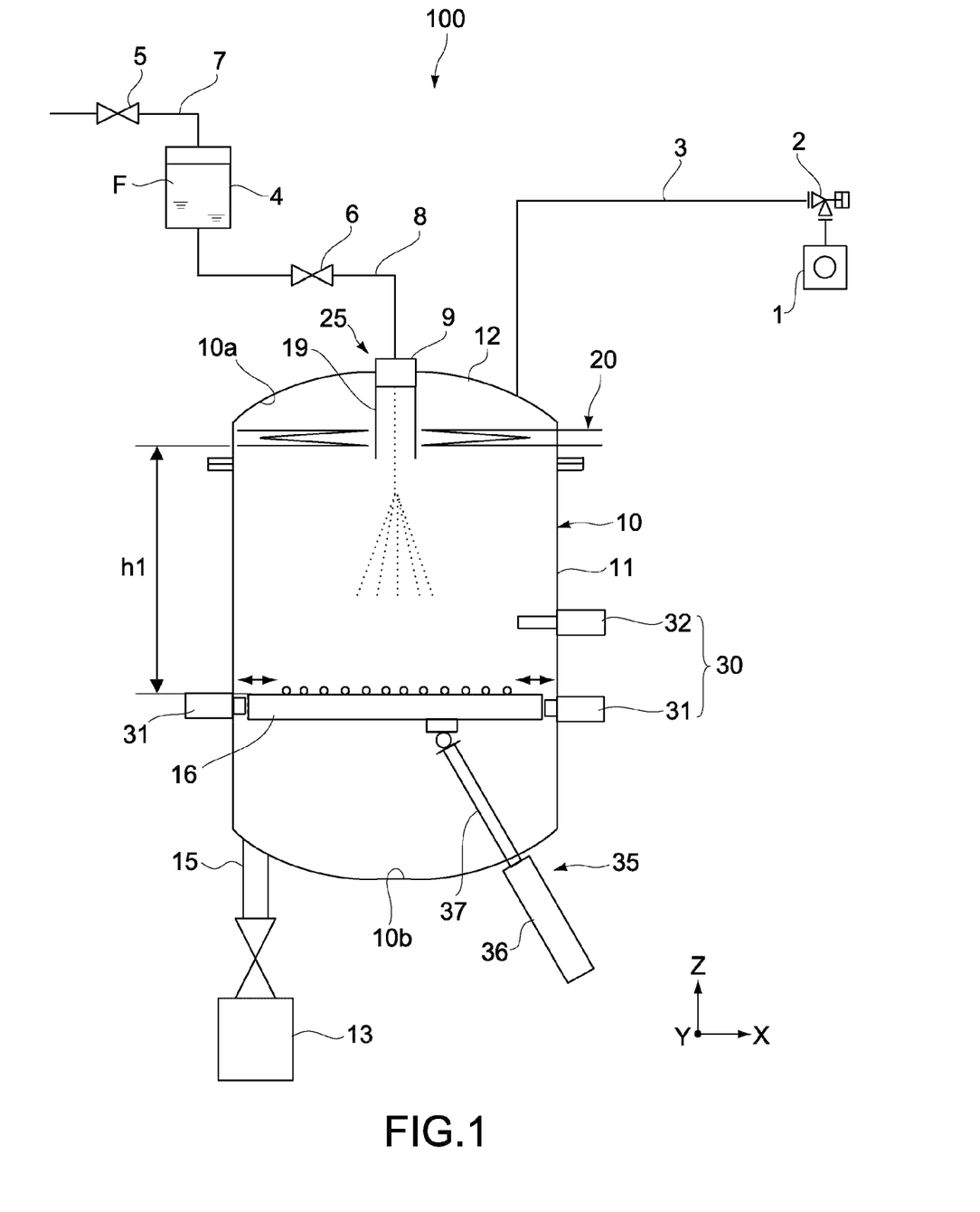
FIG. 1 A schematic view showing a freeze-drying apparatus according to an embodiment of the present invention.

FIG. 1 is a schematic view showing a freeze-drying apparatus according to an embodiment of the present invention.

A freeze-drying apparatus 100 includes: a container 4 to store a raw material fluid F; a freezing chamber 10 being a vacuum chamber; a vacuum pump 1 for exhausting the freezing chamber 10; and an injection mechanism 25 to inject the raw material fluid F stored in the container 4 into the freezing chamber 10.

Typically, the freezing chamber 10 has a cylindrical shape. The freezing chamber 10 includes: a main body 11; and a lid body 12 provided to be attachable to the main body 11. When the lid body 12 is attached to the main body 11, a top surface 10a is formed in the freezing chamber 10. Further, the freezing chamber 10 includes a bottom surface 10b arranged to be opposed to the above-mentioned top surface 10a. A degree of vacuum within the freezing chamber 10 can be controlled in a range of from 0.1 to 500 Pa, for example.

The raw material fluid F is one in a liquid form that is obtained by dissolving or dispersing fine powder of a raw material for a medical product, a food product, a cosmetic product, or the like in a solvent or a disperse media. Here, the raw material fluid F includes one classified between a solid and liquid, that has a relatively large viscosity. In the following description, the description will be made of a case where an aqueous solution is used as a typical example of the raw material fluid F, that is, a case where the solvent is water.

To the container 4, there is connected a gas-feeding tube 7 for feeding gas from a gas source (not shown) into the container 4. Nitrogen, argon, and other inert gas may be used as the gas. To the container 4, there is connected a raw material fluid-feeding tube 8 for feeding, due to a pressure of the gas fed from the gas-feeding tube 7, the raw material fluid F in the container 4 into the freezing chamber 10. To the gas-feeding tube 7 and the raw material fluid-feeding tube 8, there are respectively connected on-off valves 5 and 6. With this structure, the start and the stop for feeding the gas and the raw material fluid F or a flow rate thereof and the like are controlled.

An exhaust tube 3 is connected between the vacuum pump 1 and the freezing chamber 10. The exhaust tube 3 is provided with an exhaust valve 2.

The injection mechanism 25 includes at least a nozzle 9. For example, the nozzle 9 is provided on an upper portion of the freezing chamber 10 and is connected to the raw material fluid-feeding tube 8.

The freeze-drying apparatus 100 includes: a shelf 16 arranged in the freezing chamber 10; and a diffusion mechanism 30 to diffuse, by a vibration, the raw material received by the shelf 16. On the shelf 16, the frozen raw material of the raw material fluid F injected by the nozzle 9 is deposited.

The diffusion mechanism 30 is constituted, for example, by a plurality of plunger-type vibration generators 31 and 32. For a power source for each of the vibration generators 31 and 32, a magnetic force or an air pressure is used. Each of the vibration generators 31 and 32 is, for example, fixed to the freezing chamber 10 so that the plungers thereof abut against a peripheral portion of the shelf 16. In this manner, the shelf 16 is adapted to be vibrated.

To the shelf 16, there is connected a tilt mechanism 35 to rotate the shelf 16 about a predetermined axis, for example, a rotational axis along the Y-axis direction of FIG. 1, to thereby cause the shelf 16 to be tilted. The tilt mechanism 35 includes, for example, a rod 37 and a cylinder 36. The rod 37 is connected to a back surface of the shelf 16. The cylinder 36 is provided to be movable below the freezing chamber 10 so as to extend or retract the rod 37. Typically, the shelf 16 has a circular shape as seen in a plan view (seen in the Z-axis direction). However, the shelf 16 may have a rectangular shape.

It should be noted that although not shown, in a rotational portion of the shelf 16, for example, an air bearing or a magnetic levitation system may be used. With this, it is possible to rotate the shelf 16 in a non-sliding manner.

The vibration generators 31 operate when the shelf 16 is held in a horizontal state. The vibration generator 32 operates when the shelf 16 is tilted by the tilt mechanism 35. For example, two vibration generators 31 are provided. One vibration generator 31 may be provided or three or more vibration generators 31 may be provided. A plurality of vibration generators 32 may be similarly provided.

The shelf 16 is provided with a heating/cooling mechanism (not shown). For the heating/cooling mechanism, for example, there is used a system of circulating a liquid-phase medium in an inside of the shelf 16. As a heating mechanism for the liquid-phase medium, a resistive-heating-type heater such as a sheath heater is used. Further, a cooling mechanism for the liquid-phase medium, there is used a system of circulating the liquid-phase medium within a cooler which has been cooled with a coolant, to thereby performing a cooling. Further, the resistive-heating-type heater such as the sheath heater may be used as the heating mechanism to directly heat the shelf 16. Otherwise, a Peltier device may be used as the cooling mechanism to directly cool the shelf 16.

The freeze-drying apparatus 100 includes a cold trap 20. The cold trap 20 serves as a collection mechanism to collect a vapor, which is vaporized or sublimed from the raw material fluid F, in the freezing chamber 10.

Typically, the cold trap 20 includes a tube through which a cooling medium flows. In the cold trap 20, for example, there is used a cooling system in which the liquid-phase medium circulates through the tube, or a cooling system using a phase change of the coolant due to the circulation of the coolant. Typically, in the liquid-phase medium circulation cooling system, a cooling temperature is set to −60° C. or less. In the coolant-phase-change system, the coolant providing a cooling temperature of −120° C. or less is even used. A typical example of the liquid-phase medium includes silicone oil.

As described above, the freeze-drying apparatus 100 does not have a structure in which the vacuum chamber and the cold trap are connected to each other via the vacuum exhaust tube as in the past. Thus, a flow velocity of the vapor is decreased, and hence a phenomenon that the raw material is discharged to the outside of the vacuum chamber together with the vapor as in the past can be prevented. With this, the collection rate of the raw material can be increased. Further, it becomes unnecessary to provide the baffle plate or the like for preventing the phenomenon in vicinity of the exhaust port of the vacuum chamber.

Figure 2:
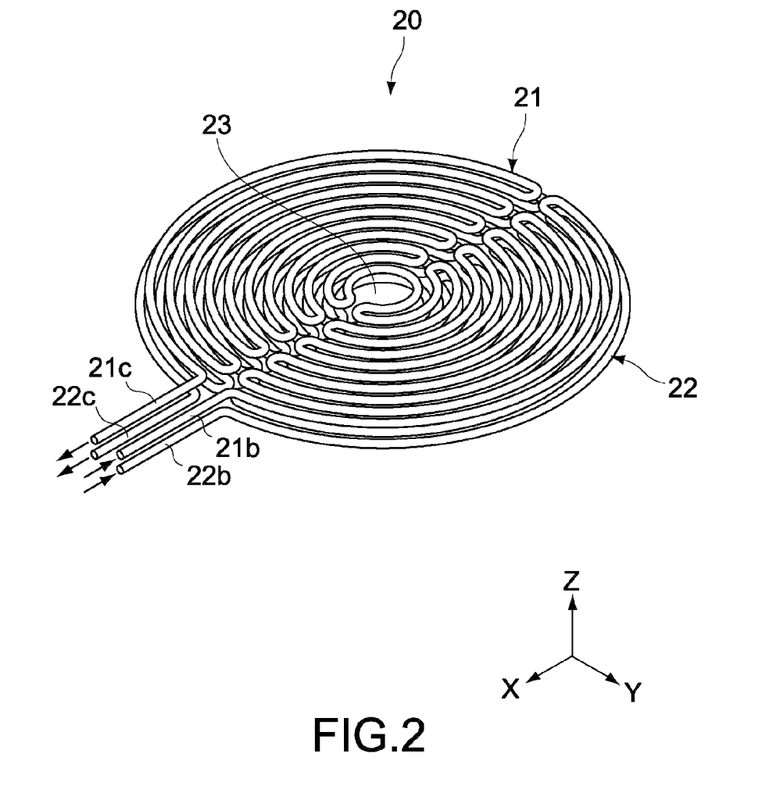
FIG. 2 A perspective view showing an example of a cold trap.
Figure 3:
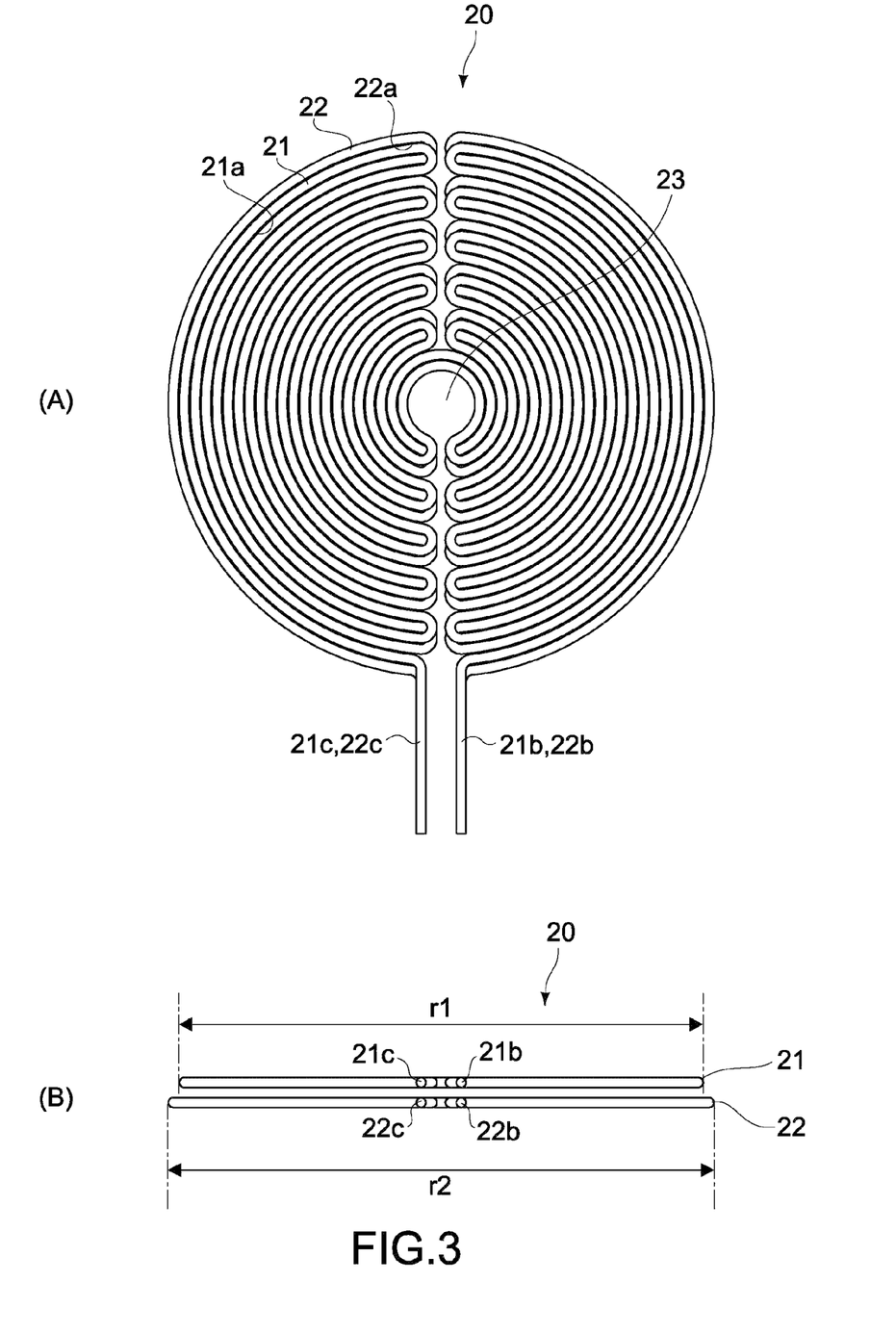
FIG. 3(A) is a plan view of the cold trap and FIG. 3(B) is a side view of the cold trap.

FIG. 2 is a perspective view showing an example of a cold trap 20. FIG. 3(A) is a plan view of the cold trap 20 and FIG. 3(B) is a side view of the cold trap 20.

The cold trap 20 is formed into a tube shape as described above. For example, the cold trap 20 is constituted by two cooling tubes 21 and 22 arranged in an upper and lower direction. The cooling tubes 21 and 22 have a curved shape so as to provide predetermined spaces (gaps) 21a and 22a, respectively. The cooling tubes 21 and 22 are each turned back at a plurality of positions. Each of the cooling tubes 21 and 22 extends, as a whole, in a circular form as seen in the plan view. As described above, each of the cooling tubes 21 and 22 is formed to extend on the plane, and hence a larger collection area for the vapor in the freezing chamber 10 can be obtained. Further, due to the large collection area, no large pressure difference is generated in the freezing chamber 10. Thus, the raw material in the particle form after frozen (hereinafter, referred to as frozen particles) can be prevented from being attracted toward the cold trap 20.

Figure 4:
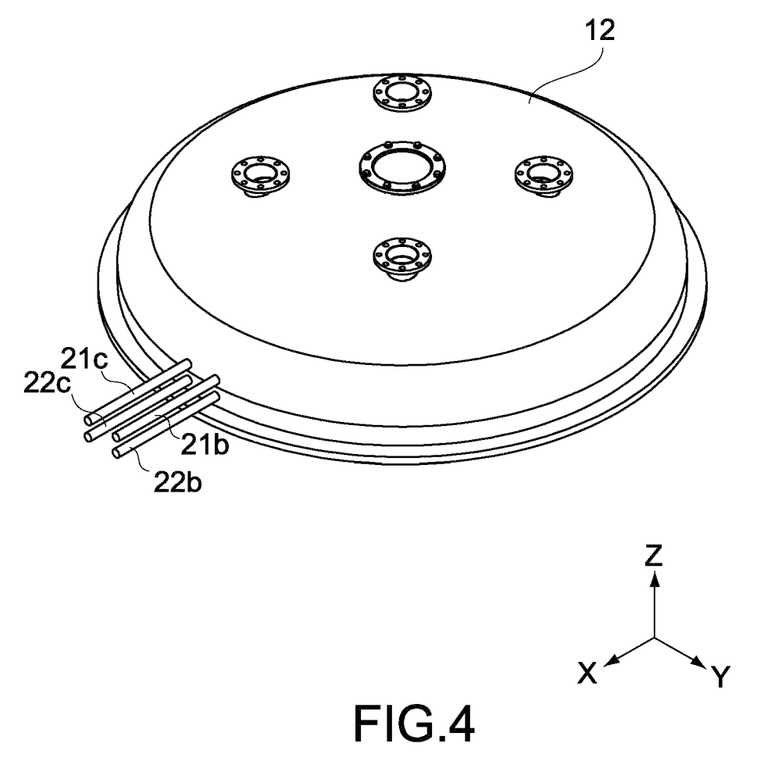
FIG. 4 A perspective view showing a lid body for a freezing chamber in which the cold trap is provided.

The cooling tubes 21 and 22 respectively include for the coolant, inlet portions 21b and 22b and outlet portions 21c and 22c, which are formed into a straight shape, for example. FIG. 4 is a perspective view showing a lid body 12 for the freezing chamber 10 in which the cold trap 20 is provided. As shown in FIG. 4, the respective cooling tubes are provided in the lid body 12 in such a manner that the inlet portions 21b and 22b and the outlet portions 21c and 22c are projected to the outside of the freezing chamber 10. The respective cooling tubes are connected to a source (not shown) of the coolant in the outside of the freezing chamber 10.

For example, during a maintenance for the freezing chamber 10, a worker removes the lid body 12. Thus, during the above-mentioned maintenance, a maintenance for the cold trap 20 provided in the lid body 12 is also possible.

As shown in FIG. 3(B), for example, a diameter r1 of the upper cooling tube 21 is set to be smaller than a diameter r2 of the lower cooling tube 22 so that the upper cooling tube 21 can be arranged above the space 22a (see FIG. 3(A)) of the lower cooling tube 22. With this configuration of the cold trap 20, it is possible to set the space to be the minimum or to eliminate the space as seen in the plan view. With this, the collection area for the vapor becomes further larger, and hence the collection rate is increased.

In a center of each of the cooling tubes 21 and 22, there is provided an opening 23. The opening 23 and the nozzle 9 fixed to the lid body 12 are aligned to each other, and the nozzle 9 injects the raw material fluid F through the opening 23 substantially in a lower direction. As shown in FIG. 1, a cover 19 is inserted in the opening 23. The cover 19 prevents the raw material fluid F injected by the nozzle 9 from splashing toward the cooling tubes 21 and 22. However, the cover 19 is not indispensable.

The shelf 16 is arranged at a height position closer to the bottom surface 10b than the top surface 10a of the freezing chamber 10. Further, the cold trap 20 is arranged at a height position closer to the top surface 10a as compared to the shelf 16 arranged at the above-mentioned height position. A height h1 is, for example, 1 m or more, the height h1 extending from a reception surface of the shelf 16 (upper surface of shelf 16), on which the raw material is received, to the cold trap 20. However, depending on process conditions, the height h1 may be smaller than 1 m. The process conditions includes, for example, the kind of the raw material, the flow rate of the raw material fluid F flowing out of the nozzle 9, the degree of vacuum within the freezing chamber 10, and the thermal process temperature for the shelf 16.

A collection container 13 to collect the raw material after freeze-dried is connected to a bottom portion of the freezing chamber 10 through a collection channel 15.

A control portion (not shown) controls the respective operations of the exhaust valve 2, the vacuum pump 1, the on-off valves 5 and 6, the rotation of the shelf 16, the vibration of the shelf 16, and the like.

The operation of the freeze-drying apparatus 100 thus configured will be described.

When the exhaust valve 2 is opened and the vacuum pump 1 is actuated, the pressure within the freezing chamber 10 is lowered so that the pressure within the freezing chamber 10 is maintained in a predetermined degree of vacuum. The shelf 16 is held in the horizontal state as shown in FIG. 1.

When the on-off valves 5 and 6 are opened, the raw material fluid F is fed to the nozzle 9 due to the gas pressure. Then, from the nozzle 9 into the freezing chamber 10, the raw material fluid F is injected. In some cases, the raw material fluid F may be previously cooled before fed into the freezing chamber 10. The raw material fluid F injected from the nozzle 9 is one in a liquid form containing moisture of the solvent before the middle of the falling of raw material fluid F. After the middle of the falling of the raw material fluid F, the moisture is vaporized or sublimed. Due to an endothermic reaction at the above-mentioned time, the raw material is frozen. The raw material is frozen, that is, the vapor is separated from the raw material, and hence the raw material is dried.

"The raw material is frozen" means a state in which the raw material is deposited on the shelf 16 and the deposited raw material is frozen in such a degree that the deposited raw material does not adhere to the shelf 16. In this case, an entire or a part of at least a surface of the raw material may be frozen.

At least during the injection of the raw material fluid F, the vapor is collected by the cold trap 20.

During the injection of the raw material fluid F, the shelf 16 is cooled by the cooling mechanism. With this, the freezing action of the particles of the raw material is promoted, and hence the productivity of the particles is increased. The temperature of the reception surface of the shelf 16, which is lowered by the cooling mechanism, is, for example, set to –60 to 0° C. (0° C., –15° C., –20° C., –22.5° C., –25° C., –30° C., –40° C., –50° C., –60° C., or another temperature).

Further, during the injection of the raw material fluid F, after the injection of the raw material fluid F, or for a time period covering the start to the termination of the injection of the raw material fluid F, the shelf 16 is vibrated in a horizontal direction due to the actuation of the vibration generator 31. With this, the frozen particles deposited on the shelf 16 are evenly diffused on the shelf 16 in such a manner that a deposition thickness thereof becomes smaller or a single layer thereof is formed. With this, a freezing efficiency and a drying efficiency of individual particles are promoted.

When the injection of the raw material fluid F is terminated, the heating mechanism heats the shelf 16. With this, the drying action of the frozen particles is promoted, and hence the productivity of the particles is promoted. In the following description, the drying process by the heating mechanism is referred to as a heat-drying in order to discriminate this drying process from the drying due to the freezing. The temperature of the deposition surface of the shelf 16, which is lowered by the heating mechanism, is, for example, set to 20 to 50° C. (20, 40, 50° C., or another temperature).

Figure 5:
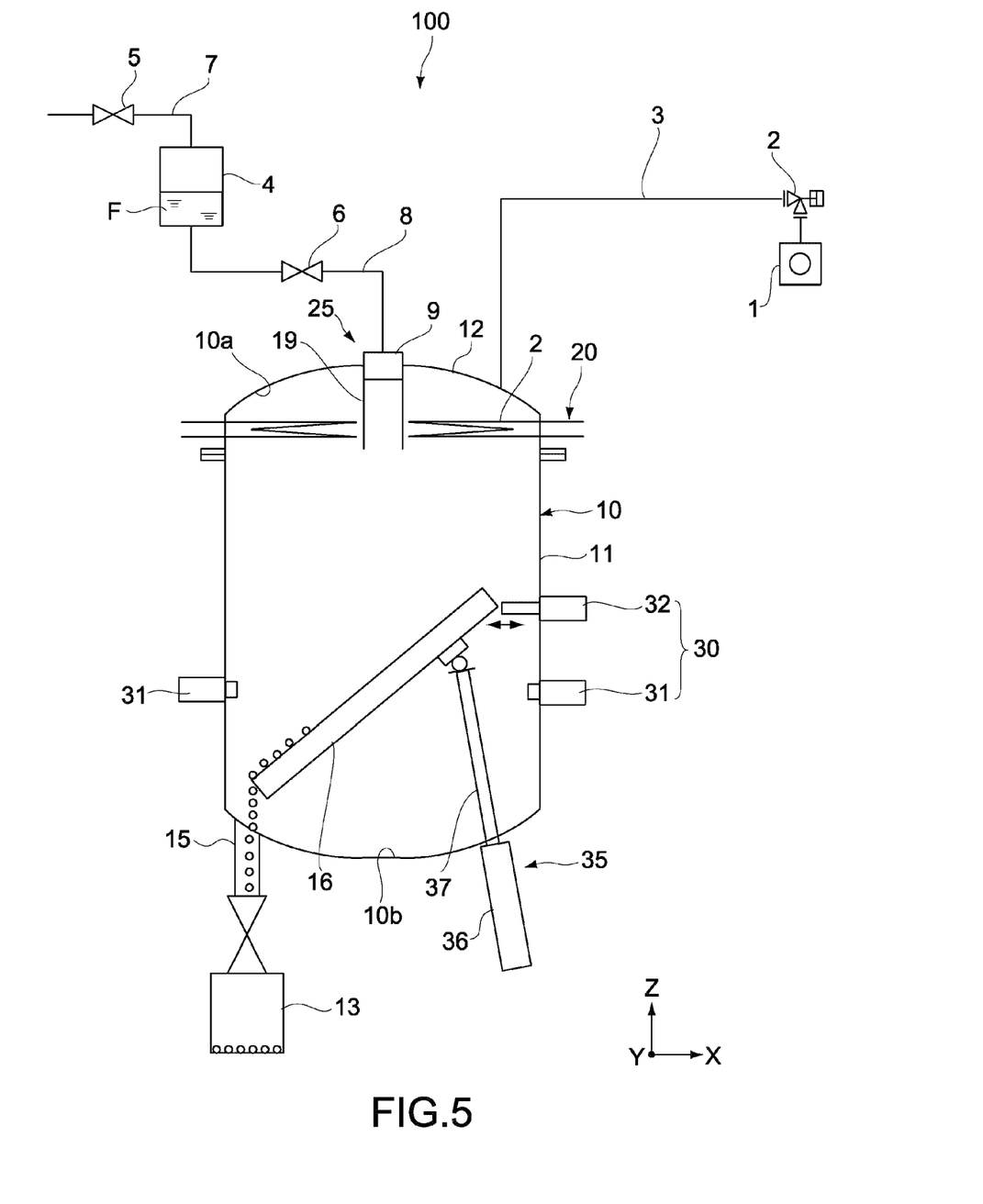
FIG. 5 A view showing a state in which particles are being collected into a collecting container in the freeze-drying apparatus shown in FIG. 1.

When the heat-drying of the frozen particles is terminated, the shelf 16 is tilted by the tilt mechanism 35 as shown in FIG. 5. Further, due to the actuation of the vibration generator 32, the shelf 16 is vibrated. With this, dried particles (particles after heat-drying is terminated) are collected through the collection channel 15 into the collection container 13 due to its own weight and an acceleration thereof due to the vibration. Although when the shelf 16 is held in the tilted state, a vibration direction of the vibration generator 32 is a substantial horizontal direction, the vibration direction of the vibration generator 32 may be the tilted direction or another direction.

In this embodiment, the raw material of the raw material fluid F injected from the nozzle 9 is vaporized or sublimed in the middle of the falling of the raw material fluid F. As described above, even in a configuration in which the raw material fluid F is injected from the nozzle 9 through the openings 23 provided in the cooling tubes 21 and 22, the height position where the raw material is frozen within the freezing chamber 10, and the height position of the cold trap 20 are away from each other in some degree. Thus, the raw material can be prevented from being attracted toward the cold trap 20 together with the vapor.

Figure 6:
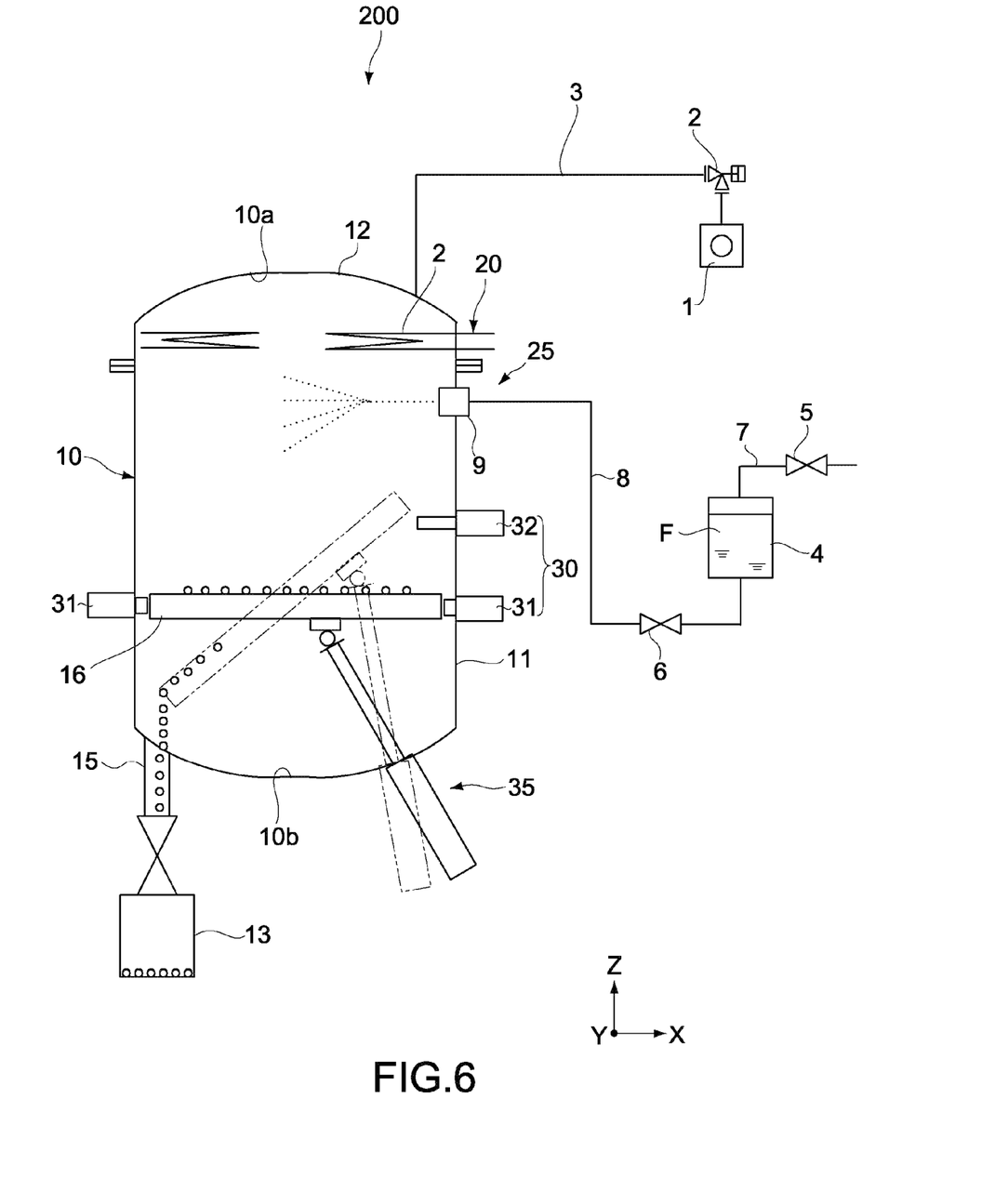
FIG. 6 A schematic view showing a freeze-drying apparatus according to another embodiment of the present invention, in a mode of injecting a raw material fluid in a horizontal direction.

FIG. 6 is a schematic view showing a freeze-drying apparatus according to another embodiment of the present invention. In the following description, the descriptions of members, functions thereof, and the like included in the freeze-drying apparatus 200, which are similar to those according to the embodiment shown in FIG. 1 and the like will be simplified or omitted, and different points will be mainly described.

In the freeze-drying apparatus 200 shown in FIG. 6, the nozzle 9 is arranged in a side surface of the freezing chamber 10 being the vacuum chamber. Thus, the raw material fluid F is injected substantially in the horizontal direction.

It should be noted that the height position of the nozzle 9 may be lower than the position shown in FIG. 6. For example, the nozzle 9 may be arranged in a height position in the middle of the distance between the cold trap 20 and the upper surface of the shelf 16, or at a height position closer to the shelf 16 as compared to the above-mentioned height position in the middle.

Figure 7:
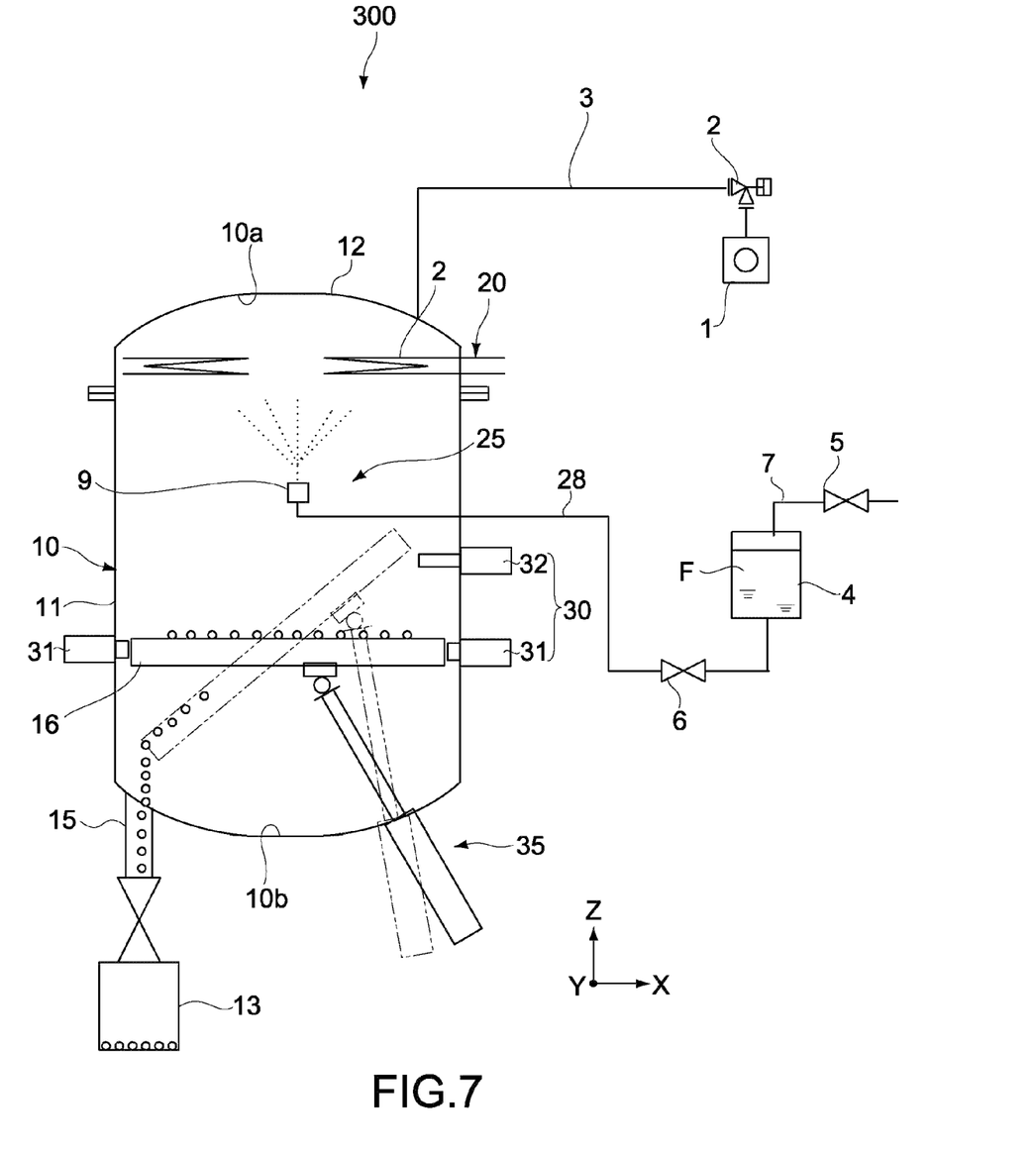
FIG. 7 A schematic view showing a freeze-drying apparatus according to still another embodiment of the present invention, in a mode of injecting a raw material fluid in an upper direction.

FIG. 7 is a schematic view showing a freeze-drying apparatus according to still another embodiment of the present invention.

The freeze-drying apparatus 300 shown in FIG. 7 includes, in the side surface of the freezing chamber 10, a raw material fluid-feeding tube 28 extending from the outside to the inside of the freezing chamber 10. To an end portion of the raw material fluid-feeding tube 28, which extends in the freezing chamber 10, the nozzle 9 is connected. The nozzle 9 injects the raw material fluid F substantially in an upper direction.

Figure 8:
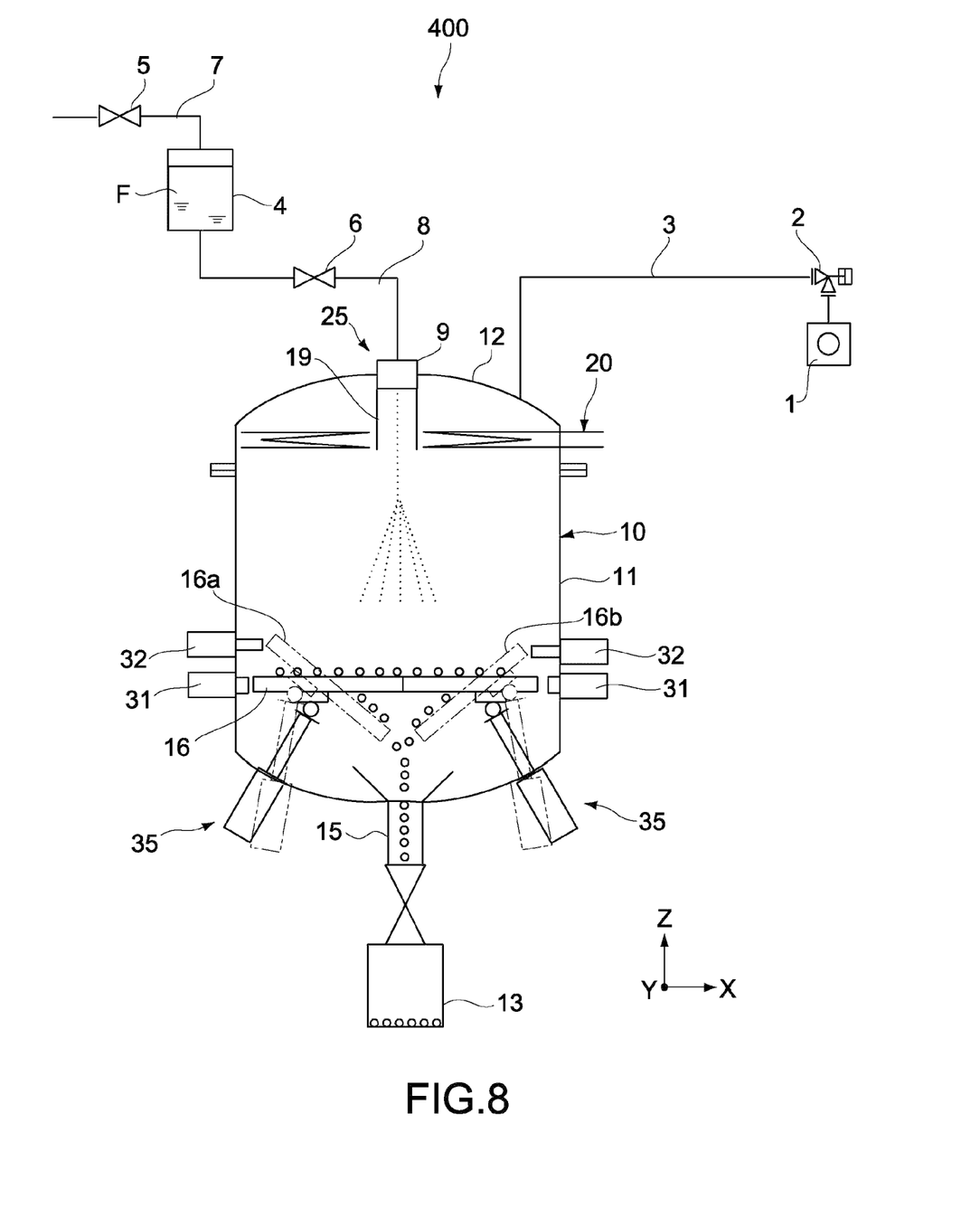
FIG. 8 A schematic view showing a freeze-drying apparatus according to still another embodiment of the present invention, in a mode in which a shelf is to be split.

FIG. 8 is a schematic view showing a freeze-drying apparatus according to still another embodiment of the present invention.

The shelf 16 provided in the freezing chamber 10 of the freeze-drying apparatus 400 is adapted to be split into a first shelf member 16a and a second shelf member 16b, for example, about the center of the shelf 16 by two tilt mechanisms 35, as indicated by the two-dot chain lines of FIG. 8. It is needless to say that the shelf 16 may be split into three or more parts by three or more tilt mechanisms 35.

The two split shelves 16 (16a and 16b) in the tilted state receive a vibration from the vibration generators 32 and 32, respectively. Through the collection channel 15 provided in the center of the bottom surface 10b of the freezing chamber 10, the particles subjected to the heat-drying (and/or frozen) are collected into the collection container 13.

Figure 9:
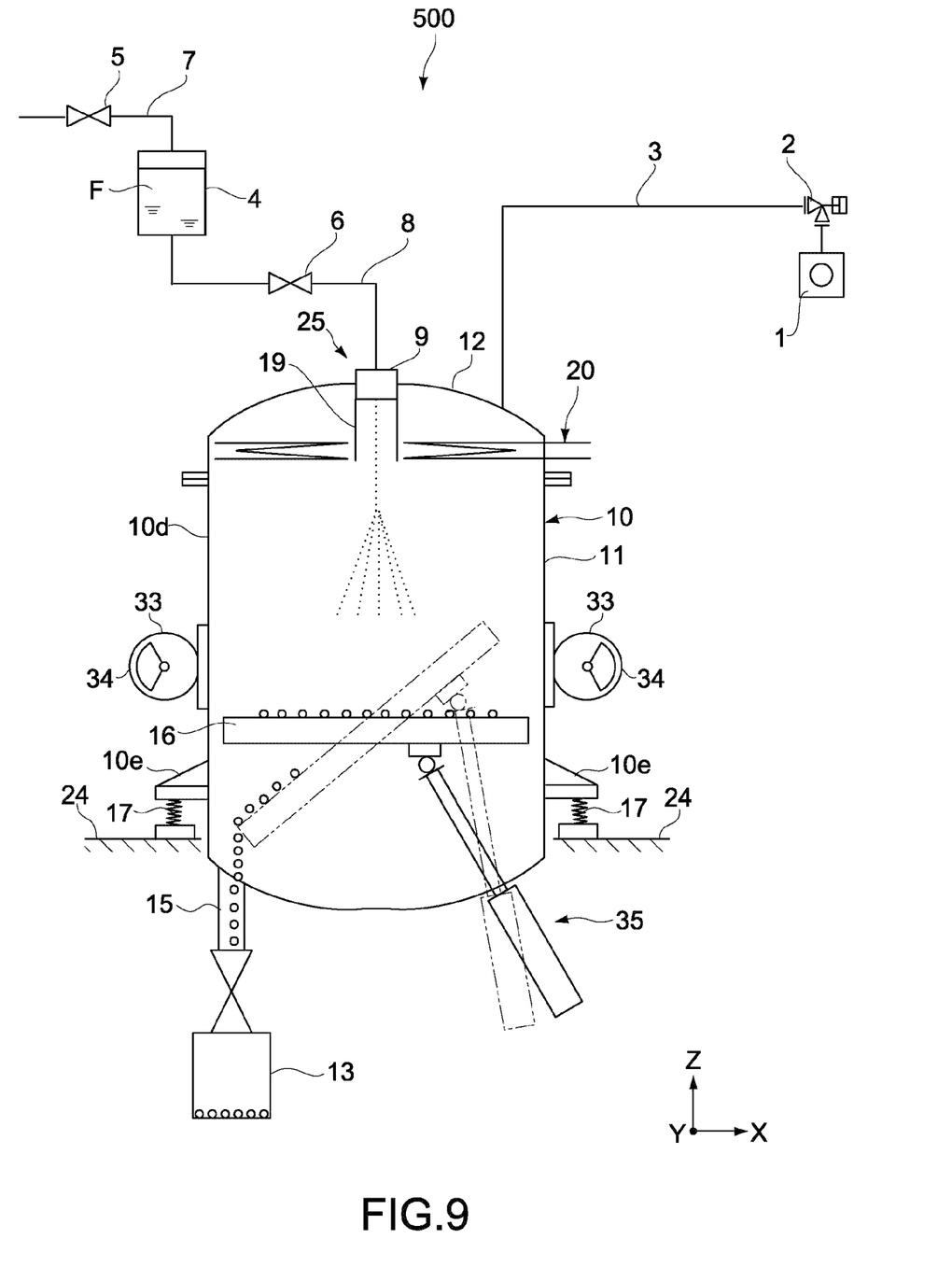
FIG. 9 A schematic view showing a freeze-drying apparatus according to still another embodiment of the present invention, in a mode in which a freezing chamber vibrates.

FIG. 9 is a schematic view showing a freeze-drying apparatus according to still another embodiment.

In the side surface of the freezing chamber 10 of the freeze-drying apparatus 500, a plurality of vibration generators 33 are provided as vibration mechanisms to vibrate the freezing chamber 10. The vibration generators 33 are vibration motors including counter weights 34, for example. Two vibration generators 33 are respectively provided at positions away from each other by 180° as seen in the plan view, for example. That is, the vibration generators 33 are provided to be opposed to each other. On the outer surface 10d of the freezing chamber 10, there are provided coil springs 17 through spring-mounting portions 10e. The freezing chamber 10 is installed in a floor 24 through the coil springs 17. With this, the freezing chamber 10 can be vibrated.

In order to cause the freezing chamber 10 to be vibrated substantially in the upper and lower direction, phases of the vibrations of both of the vibration generators 33 are controlled. Otherwise, the phases of the vibrations of both of the vibration generators 33 may be controlled in order to cause the freezing chamber 10 to be vibrated substantially in the horizontal direction.

Figure 10:
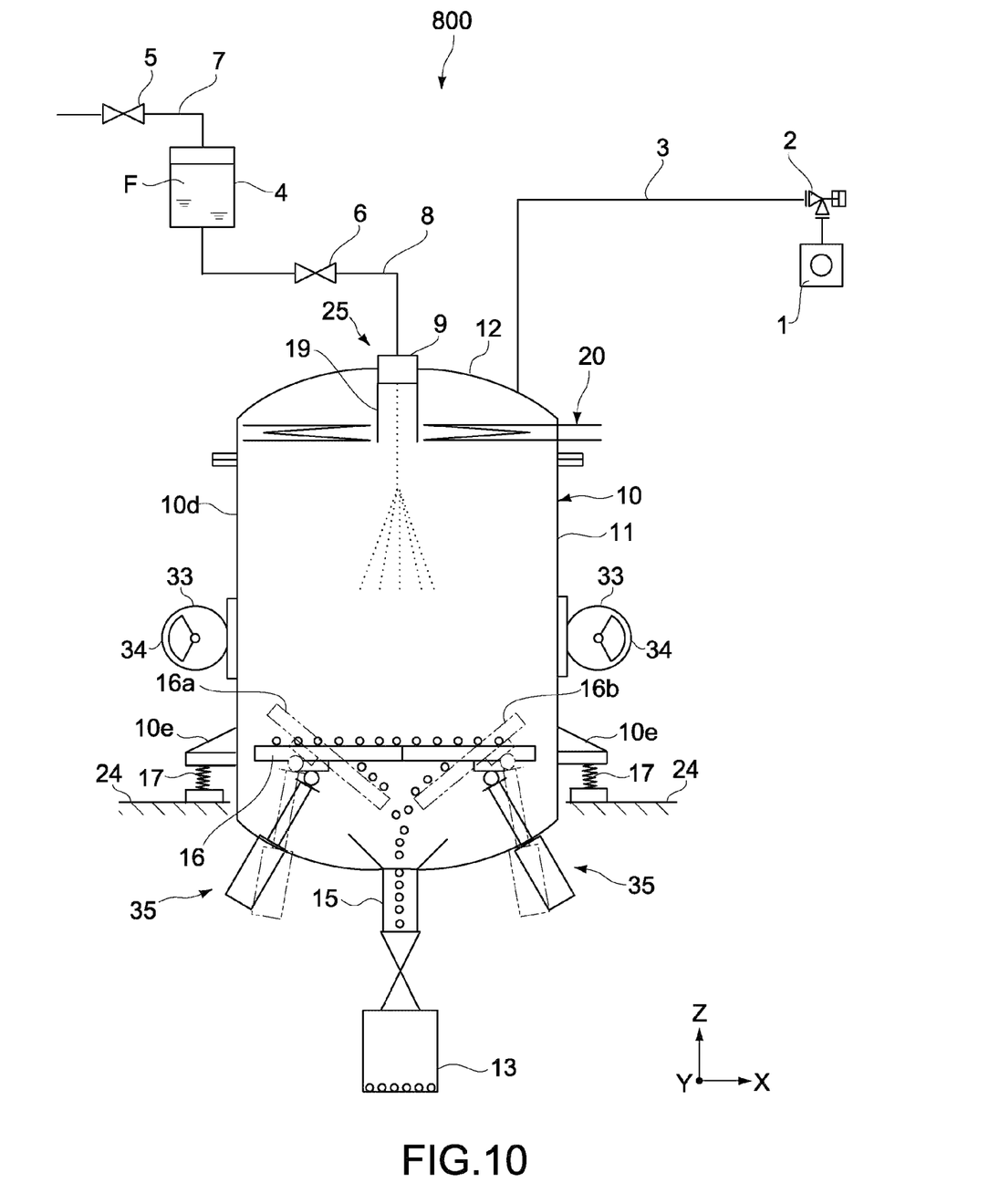
FIG. 10 A schematic view showing a freeze-drying apparatus according to still another embodiment of the present invention, in a mode in which a freezing chamber vibrates and a shelf is to be split into a plurality of shelf members.

FIG. 10 is a schematic view showing a freeze-drying apparatus according to still another embodiment of the present invention.

The freeze-drying apparatus 800 is an apparatus according to an embodiment in which the above-mentioned freeze-drying apparatuses 400 and 500 are combined to each other. That is, the vibration generators 33 to vibrate the freezing chamber 10 are provided as the diffusion mechanisms, and the shelf 16 can be split into a plurality of shelf members (16a and 16b).

Figure 11:
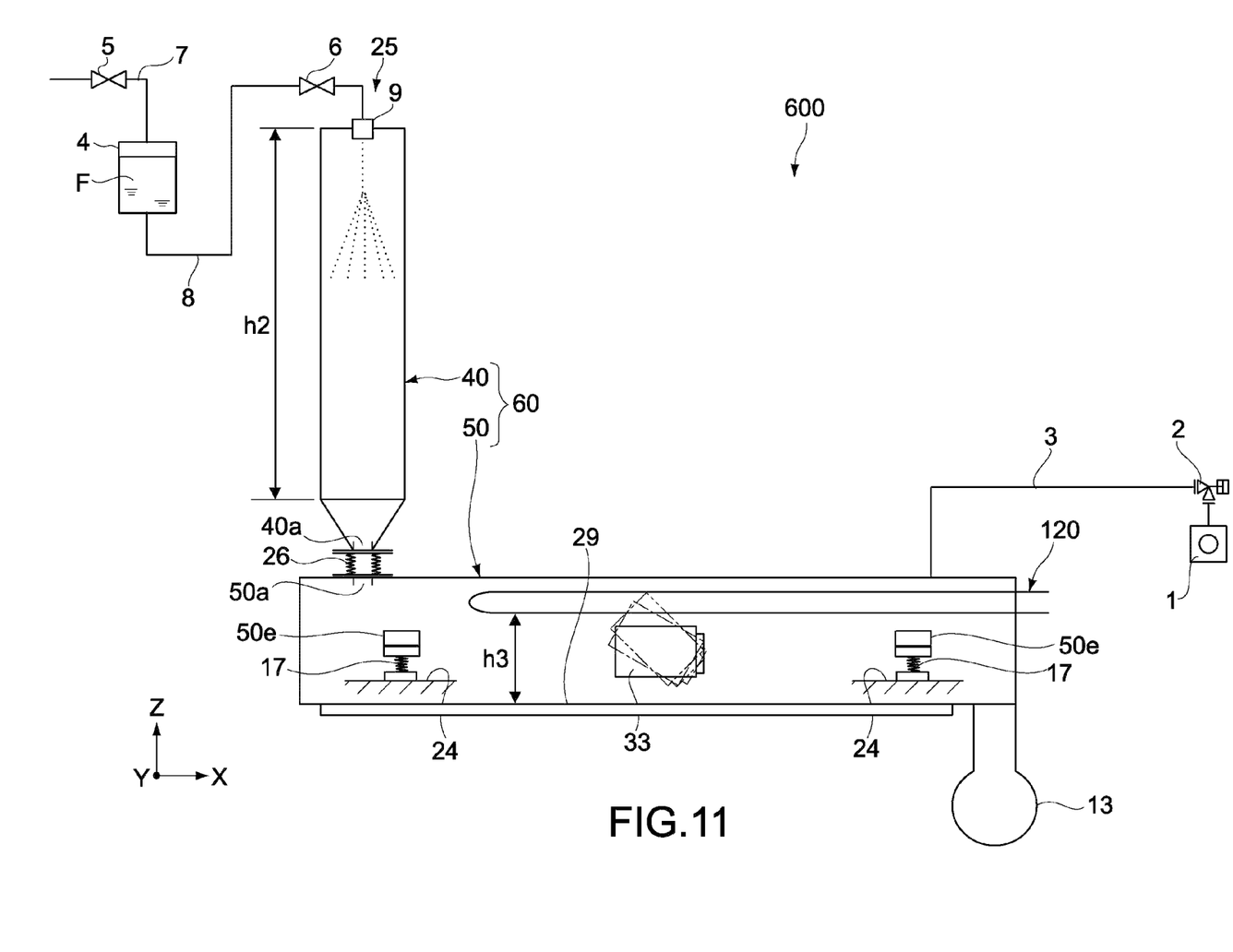
FIG. 11 A schematic view showing a freeze-drying apparatus according to still another embodiment of the present invention, in which a vacuum chamber is divided into a freezing chamber and a drying chamber.

FIG. 11 is a schematic view showing a freeze-drying apparatus according to still another embodiment of the present invention.

In the freeze-drying apparatus 600, the vacuum chamber 60 includes: a freezing chamber 40; and a drying chamber 50 long in one direction (X-axis direction). In the lower portion of the freezing chamber 40, there is provided an opening 40a. The opening 40a is communicated through a bellows 26 to an opening 50a provided in an upper portion of the drying chamber 50. In this manner, the freezing chamber 40 and the drying chamber 50 are connected to each other in a hermetically sealed manner.

In the upper portion of the freezing chamber 40, the nozzle 9 is provided. In this case, the nozzle 9 injects the raw material fluid F fed from the container 4 storing the raw material fluid F. The vacuum pump 1 is connected through the exhaust tube 3 and the exhaust valve 2 to the drying chamber 50.

In the drying chamber 50, there is provided a shelf 29 constituting a transport channel extending in a predetermined direction. Further, to an opposite side to a side on which the opening 50a of the drying chamber 50 is provided, the collection container 13 for the particles is connected. The shelf 29 receives the frozen particles falling from the freezing chamber 40 through the bellows 26, and causes the received frozen particles to be transported to the predetermined direction by a vibration. As described in the above embodiments, the shelf 29 may be configured to be capable of being thermally processed by the heating mechanism and the cooling mechanism.

For example, on an outer surface of the drying chamber 50, the vibration generators 33 to vibrate the drying chamber 50 are fixed. For the vibration generators 33, it is sufficient that the vibration motors including the counter weights 34 shown in FIG. 9 and FIG. 10 are used, for example. Further, the number of the vibration generators 33 is not limited. The coil springs 17 are provided through spring-mounting portions 50e on the outer surface of the drying chamber 50, and the drying chamber 50 is installed in the floor 24 through the coil springs 17. With this, the drying chamber 50 can be vibrated.

A mounting angle of the vibration generators 33 with respect to the drying chamber 50 can be changed obliquely with respect to the horizontal direction (X-axis direction) as indicated by the two-dot chain lines, and hence it is possible to generate a vibration in an oblique direction in the X-Z plane. The drying chamber 50 is vibrated in the oblique direction, and hence the frozen particles are transported to the predetermined direction. The mounting angle of the vibration generators 33 with respect to the drying chamber 50 can be changed, and hence a transport speed for the frozen particles can be changed under control. The mounting angle of the vibration generators 33 with respect to the drying chamber 50 may be manually changed by a worker, or may be automatically changed through a mechanism to control the above-mentioned angle.

Further, the vibration generators 33 are capable of diffusing the frozen particles deposited on the shelf 29 by its own vibration. In this case, the mounting angle of the vibration generators 33 with respect to the drying chamber 50 set to be substantially horizontal, or the mounting angle of the vibration generators 33 with respect to the drying chamber 50 set to be a predetermined angle, to thereby perform both of the diffusion and the transport of the frozen particles.

To the drying chamber 50, a cold trap 120 is connected. The vapor vaporized or sublimed mainly from the raw material fluid F injected in the freezing chamber 40 is collected by the cold trap 120 within the drying chamber 50.

It is sufficient that the general shape of the cold trap 120 as seen in the plan view is designed depending on the shape of the top surface 10a of the drying chamber 50, for example. Any shape is possible as long as the area of the cold trap 120 as seen in the Z-axis direction becomes larger as much as possible. Further, the cold trap 120 may have the tube shape as described above, and a plate-shaped cold trap 120 and a cold trap 120 having any other shape are possible.

Although a height h2 of the freezing chamber 40 is for example 1.5 m or more, the height h2 is not limited to thereto. Further, although a height h3 extending from the surface of the shelf 29 to the cold trap 120 is about 1 m, the height h3 is also not limited to this value.

The operation of the freeze-drying apparatus 600 thus configured will be described.

The frozen particles, which are injected and fallen from the nozzle 9 to be frozen, are deposited on the shelf 29 of the drying chamber 50 through the bellows 26. In a case where the shelf 29 is provided with the cooling mechanism, then the shelf 29 is cooled, to thereby promote the freezing action.

The vibration generator 33 vibrates the drying chamber 50 with a result that the frozen particles deposited on the shelf 29 are diffused. Although a timing when the vibration of the drying chamber 50 is started is typically set to be before the injection of the raw material fluid, the above-mentioned timing may be set to be during or after the injection of the raw material fluid. After that, the angle of the vibration generators 33 is changed with a result in which the frozen particles are transported toward the collection container 13. Otherwise, both of the diffusion and the transport of the particles may be performed simultaneously. The vibration of the drying chamber 50 is absorbed by the bellows 26, and hence this vibration is not transmitted to the freezing chamber 40. Otherwise, even if the above-mentioned vibration is transmitted to the freezing chamber 40, this vibration is attenuated in such a degree that the freezing chamber 40 is not influenced by this vibration.

In the case where the shelf 29 is provided with the heating mechanism, then the shelf 29 is heated, to thereby promote the drying action of the frozen particles on the shelf 29 by the heating. The particles transported toward the collection container 13 are fallen and collected into the collection container 13.

Figure 12:
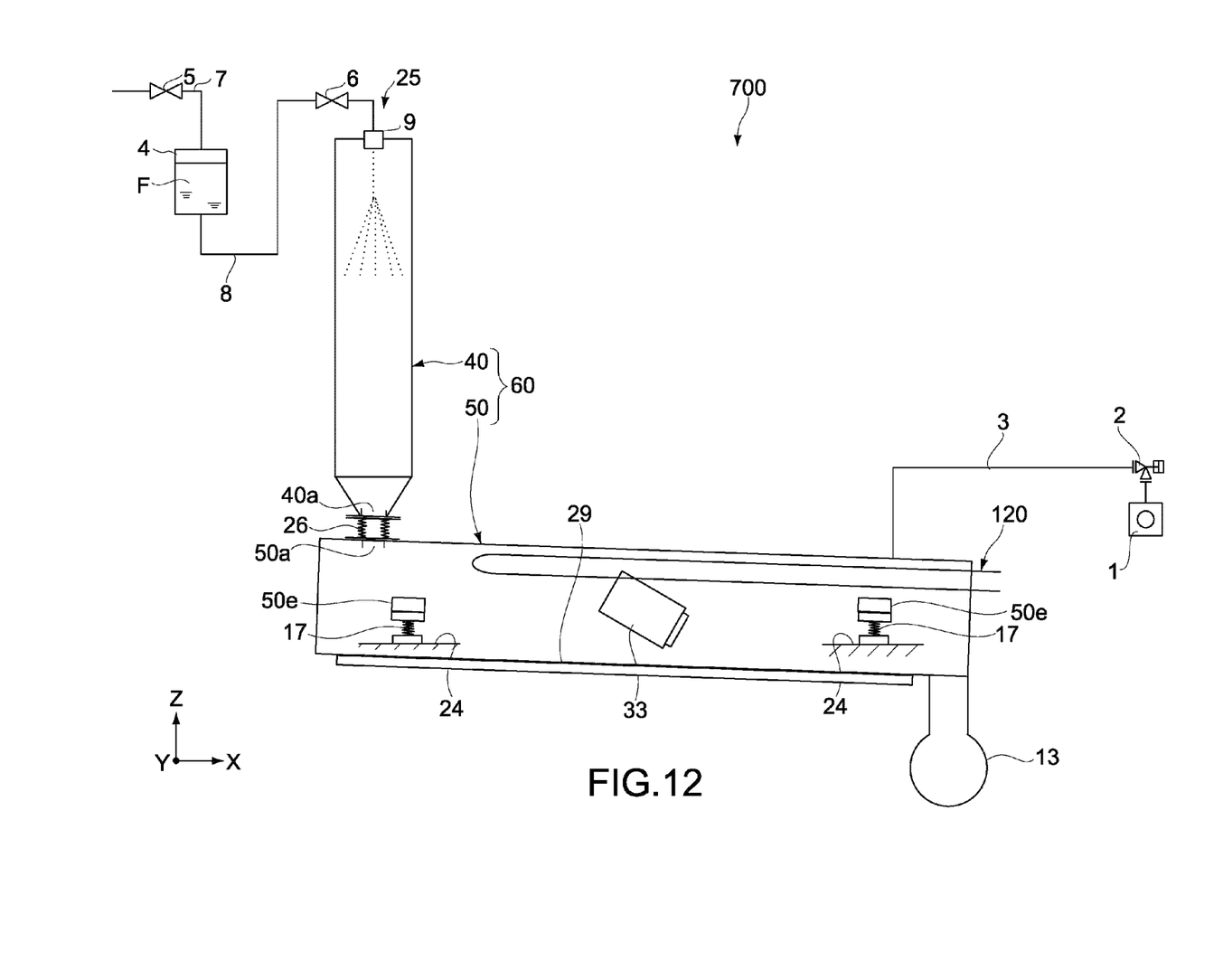
FIG. 12 A schematic view showing a freeze-drying apparatus according to still another embodiment of the present invention, in a mode in which a shelf of a drying chamber is tilted.

FIG. 12 is a schematic view showing a freeze-drying apparatus according to still another embodiment of the present invention.

The freeze-drying apparatus 700 is different from the freeze-drying apparatus 600 shown in FIG. 11 in that a longitudinal direction of the drying chamber 50 is tilted with respect to the horizontal direction (X-axis direction). In the case where the drying chamber 50 is previously provided under the tilted state as described above, even if a vibrational component generated by the vibration generator 33 is oriented only in the longitudinal direction of the drying chamber 50, the particles can be transported toward the collection container 13. However, the vibration generators 33 may be fixed in the tilted state with respect to the shelf 29 of the drying chamber 50 as shown in FIG. 12, to thereby generate the vibrational component in the oblique direction with respect to the shelf 29.

Typically, in the freeze-drying apparatus 700, both of the diffusion and the transport of the particles are performed simultaneously.

Embodiments according to the present invention are not limited to the above-mentioned embodiments, and other various embodiments are conceivable.

In each of the above-mentioned embodiments, the configuration in which the shelf 16 and the shelf 29 are provided with both of the heating mechanism and the cooling mechanism has been described. However, a configuration in which any one of the heating mechanism and the cooling mechanism is provided may be employed.

Although in the embodiments shown in FIG. 11 and FIG. 12, the configuration in which the drying chamber 50 vibrates, the drying chamber 50 may not vibrate and the shelf may vibrate in order to at least diffuse the frozen particles.

DESCRIPTION OF SYMBOLS

F . . . raw material fluid
1 . . . vacuum pump
9 . . . nozzle
10, 40 . . . freezing chamber
11 . . . main body
12 . . . lid body
16, 29 . . . shelf
20, 120 . . . cold trap
21, 22 . . . cooling tube
21a, 22a . . . space
23 . . . opening
25 . . . injection mechanism
30 . . . diffusion mechanism
31, 32, 33 . . . vibration generator
35 . . . tilt mechanism
40 . . . freezing chamber
50 . . . drying chamber
60 . . . vacuum chamber
100, 200, 300, 400, 500, 600, 700, 800 . . . freeze-drying apparatus

The invention claimed is:

1. A freeze-drying apparatus, comprising:
a freezing chamber which is a vacuum chamber capable of being exhausted;
an injection mechanism to inject a raw material fluid including a raw material into the freezing chamber exhausted;
a shelf to receive the raw material frozen when the raw material fluid is injected, the shelf being arranged within the freezing chamber;
a diffusion mechanism to at least diffuse the raw material on the shelf by a vibration, the raw material being received on the shelf; and
a tilt mechanism to tilt the shelf in order to collect the raw material on the shelf;
wherein the shelf includes at least
a first shelf member, and
a second shelf member,
wherein the tilt mechanism includes,
a first tilt mechanism to tilt the first shelf member, and
a second tilt mechanism to tilt the second shelf member,
wherein the first shelf member and the second shelf member are tilted by the first tilt mechanism and the second tilt mechanism, respectively, to thereby split the shelf into the first shelf member and the second shelf member, and
wherein the diffusion mechanism includes
a first vibration generator to vibrate the first shelf member and the second shelf member when the first shelf member and the second shelf member are is held in a horizontal state, and
a second vibration generator to vibrate the first shelf member and the second shelf member when the first shelf member and the second shelf member are is held in a tilted state.

* * * * *